(12) United States Patent
Chu et al.

(10) Patent No.: US 11,494,117 B2
(45) Date of Patent: Nov. 8, 2022

(54) METHOD AND SYSTEM FOR DATA PROCESSING

(71) Applicant: INNOGRIT TECHNOLOGIES CO., LTD., Shanghai (CN)

(72) Inventors: Ying Chu, Shanghai (CN); Wei Chou, Shanghai (CN); Qian Cheng, Shanghai (CN); Cheng-Yun Hsu, Shanghai (CN); Qun Zhao, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 307 days.

(21) Appl. No.: 16/746,844

(22) Filed: Jan. 18, 2020

(65) Prior Publication Data
US 2020/0319825 A1 Oct. 8, 2020

(30) Foreign Application Priority Data

Apr. 2, 2019 (CN) .......................... 201910262141.3

(51) Int. Cl.
*G06F 3/06* (2006.01)
*G06F 16/2455* (2019.01)
*G06F 16/23* (2019.01)

(52) U.S. Cl.
CPC .......... *G06F 3/0659* (2013.01); *G06F 3/0604* (2013.01); *G06F 3/0652* (2013.01); *G06F 3/0673* (2013.01); *G06F 16/2379* (2019.01); *G06F 16/2455* (2019.01)

(58) Field of Classification Search
CPC .... G06F 3/0659; G06F 3/0604; G06F 3/0652; G06F 3/0673; G06F 16/2379; G06F 16/2455
See application file for complete search history.

(56) References Cited

U.S. PATENT DOCUMENTS

| 8,880,787 | B1 * | 11/2014 | Kimmel | G06F 16/128 |
| | | | | 711/170 |
| 10,114,566 | B1 * | 10/2018 | Chatterjee | G06F 12/0806 |
| 10,620,850 | B1 * | 4/2020 | Xu | G06F 3/0619 |

(Continued)

FOREIGN PATENT DOCUMENTS

| CN | 105224532 A | 1/2016 |
| CN | 107203330 A | 9/2017 |

(Continued)

*Primary Examiner* — Ryan Bertram
(74) *Attorney, Agent, or Firm* — Womble Bond Dickinson (US) LLP

(57) ABSTRACT

A method for data processing, comprising updating intermediate storage information according to data to be processed and address information of the data to be processed in a first storage space, until the intermediate storage information has reached a preset size; and performing, in the first storage space, an operation corresponding to the data to be processed using the intermediate storage information, when the intermediate storage information reaches the preset size. By the above method, the computing cost for performing an operation corresponding to the data to be processed in the first storage space can be reduced, the efficiency in performing the corresponding operation can be improved, and with intermediate storage information adapted to the first storage spaces of different sizes, the number of operations on the first storage spaces can be reduced.

21 Claims, 11 Drawing Sheets

(56) References Cited

U.S. PATENT DOCUMENTS

| | | | |
|---|---|---|---|
| 2003/0056069 A1* | 3/2003 | Cabrera | G06F 12/123 |
| | | | 711/161 |
| 2005/0259672 A1* | 11/2005 | Eduri | G06F 13/385 |
| | | | 370/412 |
| 2009/0037499 A1 | 2/2009 | Muthulingam et al. | |
| 2012/0051366 A1* | 3/2012 | Li | H04L 49/9057 |
| | | | 370/412 |
| 2012/0221774 A1* | 8/2012 | Atkisson | G06F 12/0895 |
| | | | 711/103 |
| 2013/0185536 A1* | 7/2013 | Mari | G06F 12/08 |
| | | | 711/216 |
| 2016/0098198 A1 | 4/2016 | Bosshart et al. | |
| 2017/0228373 A1* | 8/2017 | Mueller | G06F 16/24552 |
| 2017/0344269 A1* | 11/2017 | Kumano | G06F 3/0649 |
| 2018/0032439 A1* | 2/2018 | Jenne | G06F 12/0891 |
| 2018/0217776 A1* | 8/2018 | Ajila | G06F 3/065 |
| 2019/0026042 A1* | 1/2019 | Gupta | G06F 3/0641 |

FOREIGN PATENT DOCUMENTS

| | | |
|---|---|---|
| CN | 107273040 A | 10/2017 |
| CN | 107491523 A | 12/2017 |
| CN | 107710140 A | 2/2018 |

\* cited by examiner

METHOD AND SYSTEM FOR DATA PROCESSING

CROSS-REFERENCE TO RELATED APPLICATION

The present application is based upon and claims the benefit of a priority of Chinese Patent Application No. 201910262141.3, filed on Apr. 2, 2019, the entire contents of which are incorporated herein by reference.

TECHNICAL FIELD

The present disclosure relates to the field of storing technologies, in particular to a method and device for data processing.

BACKGROUND

As the development of information technologies, the amount of data in data processing has been larger; correspondingly, the storage space for memories has become larger for the increasing amount of data. However, together with the convenience from the memories of large storage space, problems have been introduced as well. For example, for a memory of large volume, updating of the data in the memory is performed by mapping tables between logic addresses and physical addresses, thus a large amount of mapping tables need to be maintained in a local space when the memory has a too big volume, resulting in low efficiency of data updating.

SUMMARY

For this, the present disclosure provides a method for data processing, comprising:

updating intermediate storage information according to data to be processed and address information of the data to be processed in a first storage space, until the intermediate storage information has reached a preset size, wherein the intermediate storage information includes storage space information of the first storage space and the data to be processed that has been updated into the intermediate storage information, and the data to be processed that has been updated into the intermediate storage information has a correspondence with the storage space information with the correspondence being established based on the address information; and performing, in the first storage space, an operation corresponding to the data to be processed using the intermediate storage information, when the intermediate storage information reaches the preset size.

In one possible implementation, the storage space information includes correspondences between blocks divided from the first storage space and Hash values; the intermediate storage information further includes header units and section units, with the header units carrying block information and the section units carrying data to be processed that has been updated; wherein updating intermediate storage information according to data to be processed and address information of the data to be processed in a first storage space comprises:

determining a block corresponding to the address information of the data to be processed and a Hash value of the block;

querying in the intermediate storage information whether there is a first header unit corresponding to the Hash value of the block;

if said first header unit does not exist, acquiring an idle unit in a second storage space as said first header unit; and writing block information of the block into the first header unit.

In one possible implementation, updating intermediate storage information according to data to be processed and address information of the data to be processed in a first storage space further comprises:

in the case that said first header unit exists and the block information carried by the first header unit is different from the block information of the block, acquiring an idle unit in the second storage space as a second header unit;

writing the block information of the block into the second header unit; and linking the second header unit to the first header unit.

In one possible implementation, updating intermediate storage information according to data to be processed and address information of the data to be processed in a first storage space further comprises:

in the case that said first header unit exists and the block information carried by the first header unit is the same as the block information of the block, acquiring an idle unit in the second storage space as a section unit;

writing data information and the address information of the data to be processed into the section unit; and inserting the section unit at the end of the linked list where the first header unit is located.

In one possible implementation, performing, in the first storage space, an operation corresponding to the data to be processed using the intermediate storage information when the intermediate storage information reaches the preset size comprises:

with regard to a header unit in the intermediate storage information, with an order of the section units in the linked list where the first header unit is located, acquiring the data information and the address information in each of the section units;

determining an address to be processed for the first storage space from the address information; and performing the operation at the address to be processed using the data information.

In one possible implementation, the data information includes data content and a data length of the data to be processed, wherein performing the operation at the address to be processed using the data information comprises:

writing the data content into the first storage space in accordance with the data length and the address to be processed.

In one possible implementation, the data information includes valid-or-invalid enabling information, initiative flash page and an update length, wherein performing the operation at the address to be processed using the data information comprises:

setting a corresponding position in the first storage space valid or invalid according to the valid-or-invalid enabling information, the initiative flash page, the update length and the address to be processed.

In one possible implementation, after performing in the first storage space an operation corresponding to the data to be processed using the intermediate storage information, the method further comprises:

releasing the header unit and the section unit in the intermediate storage information as idle units.

In one possible implementation, the method further comprises:

acquiring a request for data query, and querying data in the intermediate storage information according to the request for data query.

In one possible implementation, the method further comprises:

acquiring a request for data deletion, and deleting data in the intermediate storage information according to the request for data deletion.

In one possible implementation, the method further comprises:

dividing the first storage space into multiple blocks, and numbering the divided blocks;

processing the number for each block to obtain, as the storage space information of the first storage space, the Hash value of each block as well as a correspondence for each block between said block and the Hash value.

In one possible implementation, the method further comprises:

dividing the second storage space into multiple units, and setting the multiple units to a status of idle.

According to another aspect of the present disclosure, there is provided a device for data processing, comprising:

an updating module, configured to update intermediate storage information according to data to be processed and address information of the data to be processed in a first storage space, until the intermediate storage information has reached a preset size, wherein the intermediate storage information includes storage space information of the first storage space and the data to be processed that has been updated into the intermediate storage information, and the data to be processed that has been updated into the intermediate storage information has a correspondence with the storage space information with the correspondence being established based on the address information; and a performing module connected to the updating module, the performing modules is configured to perform, in the first storage space, an operation corresponding to the data to be processed using the intermediate storage information, when the intermediate storage information reaches the preset size.

In one possible implementation, the storage space information includes correspondences between blocks divided from the first storage space and Hash values; the intermediate storage information further includes header units and section units, with the header units carrying block information and the section units carrying data to be processed that has been updated; wherein the updating module comprises:

a first determining sub-module, configured to determine a block corresponding to the address information of the data to be processed and a Hash value of the block;

a querying sub-module connected to the first determining sub-module, the querying sub-module is configured to query in the intermediate storage information whether there is a first header unit corresponding to the Hash value of the block;

a first acquiring sub-module connected to the querying sub-module, the first acquiring sub-module is configured to acquire an idle unit in a second storage space as said first header unit if said first header unit does not exist; and a writing sub-module connected to the first acquiring sub-module, the writing sub-module is configured to write block information of the block into the first header unit.

In one possible implementation, the first acquiring sub-module is further configured to acquire an idle unit in the second storage space as a second header unit, in the case that said first header unit exists and the block information carried by the first header unit is different from the block information of the block;

the writing sub-module is further configured to write the block information of the block into the second header unit; wherein, the updating module further comprises:

a linking sub-module connected to the writing sub-module, the linking sub-module is configured to link the second header unit to the first header unit.

In one possible implementation, the first acquiring sub-module is further configured to acquire an idle unit in the second storage space as a section unit, in the case that said first header unit exists and the block information carried by the first header unit is the same as the block information of the block;

the writing sub-module is further configured to write the data information and the address information of the data to be processed into the section unit;

the linking sub-module is further configured to insert the section unit at the end of the linked list where the first header unit is located.

In one possible implementation, the performing module comprises:

a second acquiring sub-module, configured to acquire, with regard to a header unit in the intermediate storage information and with an order of the section units in the linked list where the first header unit is located, the data information and the address information in each of the section units;

a second determining sub-module connected to the second acquiring sub-module, the second determining sub-module is configured to determine an address to be processed for the first storage space from the address information;

a performing sub-module connected to the second determining sub-module, the performing sub-module is configured to perform the operation at the address to be processed using the data information.

In one possible implementation, the data information includes data content and a data length of the data to be processed, wherein the performing sub-module is further configured to write the data content into the first storage space in accordance with the data length and the address to be processed.

In one possible implementation, the data information includes valid-or-invalid enabling information, initiative flash page and an update length, wherein the performing sub-module is further configured to set a corresponding position in the first storage space valid or invalid according to the valid-or-invalid enabling information, the initiative flash page, the update length and the address to be processed.

In one possible implementation, the device further comprises:

a releasing module connected to the performing module, the releasing module is configured to release header units and section units in the intermediate storage information as idle units, after performing, by the performing module, in the first storage space an operation corresponding to the data to be processed using the intermediate storage information.

In one possible implementation, the device further comprises:

a querying module connected to the updating module, the querying module is configured to acquire a request for data query and query data in the intermediate storage information according to the request for data query.

In one possible implementation, the device further comprises:

a deleting module connected to the updating module, the deleting module is configured to acquire a request for data deletion and delete data in the intermediate storage information according to the request for data deletion.

In one possible implementation, the device further comprises:

a first dividing module configured to divide the first storage space into multiple blocks, and number the divided blocks;

a processing module connected to the first dividing module, the processing module is configured to process the number for each block to obtain, as the storage space information of the first storage space, the Hash value of each block as well as a correspondence for each block between said block and the Hash value.

In one possible implementation, the device further comprises:

a second dividing module configured to divide the second storage space into multiple units and set the multiple units to a status of idle.

According to another aspect of the present disclosure, there is provided a device for data processing, comprising a processor and a memory configured to store instructions executable by the processor; wherein the processor is configured to perform the above mentioned method.

According to another aspect of the present disclosure, there is provided a non-volatile computer readable storage medium storing computer program instructions, wherein when being executed by a processor, the computer program instructions cause the processor to perform the above mentioned method.

According to another aspect of the present disclosure, there is provided a computer program product comprising computer program instructions causing a computer to perform the above mentioned method.

By the above mentioned method, after acquiring the data to be processed, the present disclosure teaches to update the intermediate storage information according to the data to be processed and the address information of the data to be processed in the first storage space, until the intermediate storage information has reached a preset size; and performing in the first storage space an operation corresponding to the data to be processed using the intermediate storage information when the intermediate storage information reaches the preset size. According to the present disclosure, by updating the intermediate storage information with data to be processed and performing in the first storage space an operation corresponding to the data to be processed using the intermediate storage information when the intermediate storage information reaches a certain size, the computing cost for performing an operation corresponding to the data to be processed in the first storage space can be reduced, the efficiency in performing the corresponding operation can be improved, and with intermediate storage information adapted to the first storage spaces of different sizes, the number of operations on the first storage spaces can be reduced.

Other features and aspects will be made clear by detailed description of exemplary embodiments with reference to the following attached drawings.

BRIEF DESCRIPTION OF THE DRAWINGS

The attached drawings included in and constituting a part of the description together with the description illustrate exemplary embodiments, features, and aspects of the present disclosure, and are used to explain the principles of the present disclosure.

DETAILED DESCRIPTION

Figure 1:
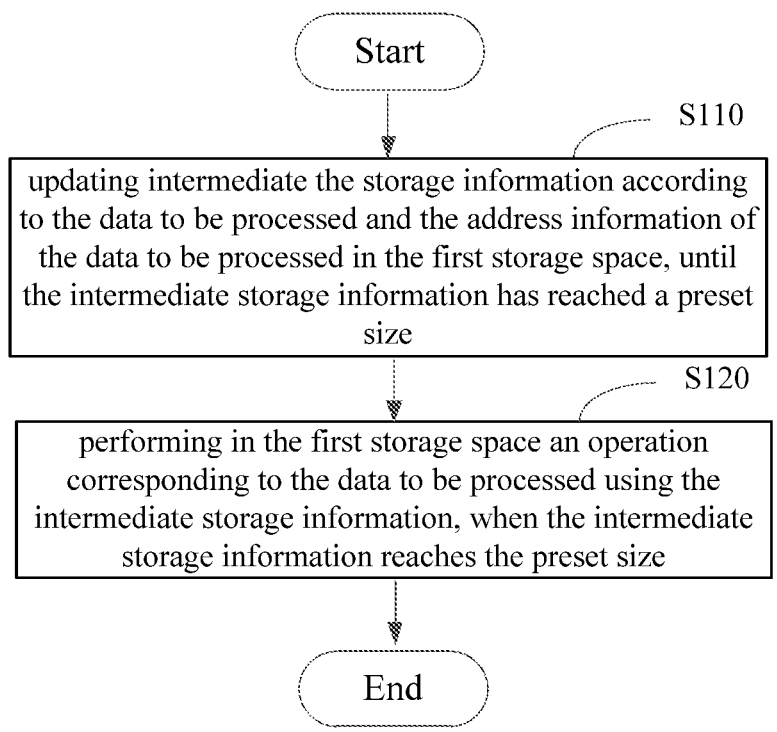
FIG. 1 shows a flowchart of the method for data processing according to one embodiment of the present disclosure.

Various exemplary embodiments, features and aspects of the p[resent disclosure are detailed below by taking reference to the drawings. Similar numerical references in the drawings represent the same or similar elements. Although various aspects of embodiments are shown in the drawings, these are not necessarily in scale unless specifically indicated.

The term "exemplary" herein means "used as an example, embodiment, or illustration". Any embodiment described herein as "exemplary" need not to be interpreted as assuperior or better than other embodiments.

In addition, in order to describe the present disclosure better, many specific details are given in the implementations below. One skilled in the art should understand that the present disclosure can also be implemented without certain specific details. In some instances, methods, manners, elements, and circuits well known to one skilled in the art are not described in detail, so as to highlight the main thrust of this disclosure.

Referring to FIG. 1, FIG. 1 shows a flowchart of the method for data processing according to one embodiment of the present disclosure.

The method can be applied in a terminal or a server. As shown in FIG. 1, the method comprises:

At step S110, updating intermediate the storage information according to the data to be processed and the address information of the data to be processed in the first storage space, until the intermediate storage information has reached a preset size, wherein the intermediate storage information includes storage space information of the first storage space and the data to be processed that has been updated into the intermediate storage information, and the data to be processed that has been updated into the intermediate storage information has a correspondence with the storage space information with the correspondence being established based on the address information.

At step S120, performing in the first storage space an operation corresponding to the data to be processed using the intermediate storage information, when the intermediate storage information reaches the preset size.

By the above mentioned method, after acquiring the data to be processed, the present disclosure teaches to update the intermediate storage information according to the data to be processed and the address information of the data to be processed in the first storage space, until the intermediate storage information has reached a preset size; and performing in the first storage space an operation corresponding to the data to be processed using the intermediate storage information when the intermediate storage information reaches the preset size. According to the present disclosure, by updating the intermediate storage information with data to be processed and performing in the first storage space an operation corresponding to the data to be processed using the intermediate storage information when the intermediate storage information reaches a certain size, the computing cost for performing an operation corresponding to the data to be processed in the first storage space can be reduced, the efficiency in performing the corresponding operation can be improved, and with intermediate storage information adapted to the first storage spaces of different sizes, the number of operations on the first storage spaces can be reduced.

In one possible implementation, the data to be processed may include data content (data information), and the address information of the data to be processed is the address information in the first storage space. By the address information of the data to be processed, a corresponding storage position in the first storage space can be located, and the corresponding operation can be performed using the data content of the data to be processed.

In one possible implementation, the first storage space can be the storage spaced of a memory of large space, such as an HDD, an SDD or the likes. It should be understand that, the storage space of memories of the type of HDD, SDD or the likes is usually large; in particular, the storage space of memories of the type of HDD, SDD or the likes is larger than a local storage space such as an SRAM.

In one possible implementation, the storage space information includes correspondences between blocks divided from the first storage space and Hash values; the intermediate storage information further includes header units and section units, with the header units carrying block information and the section units carrying data to be processed that has been updated.

In one possible implementation, the first storage space can be divided into multiple blocks, and the divided blocks are numbered; the number for each block is processed to obtain, as the storage space information of the first storage space, the Hash value of each block as well as a correspondence for each block between said block and the Hash value (Hash list).

In one possible implementation, the block size of each block can be set as needed. For example, the size of each block can be 4 KB, 16 KB and soon. After the size of block has been set as needed, the first storage spaced can be divided into multiple blocks according to the size of the first storage space and the size of each block. After the first storage space has been divided into multiple blocks and the multiple blocks have been numbered; the number for each block can be processed to obtain, as the storage space information of the first storage space, the Hash value of each block as well as a correspondence for each block between said block and the Hash value.

In one possible implementation, various possible manners can be selected as needed for the processing on the number for each block, to obtain the Hash value of each block as well as a correspondence for each block between said block and the Hash value. For example, one of many possible manners, such as a method dividing to leave a remainder, a folding method and a middle-square method, can be selected for the processing on the number for each block. The resulting Hash value of each block after the processing may be or may not be the same, which is not limited by the present disclosure.

Figure 2:
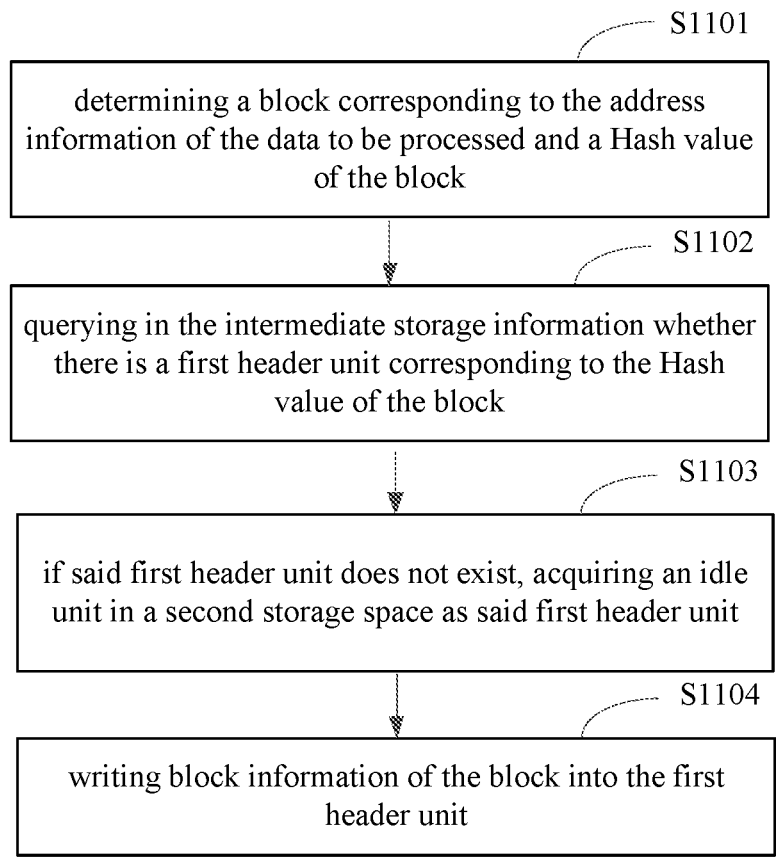
FIG. 2 shows a potential implementation diagram of step S110 in the method for data processing according to one embodiment of the present disclosure.

Referring to FIG. 2, FIG. 2 shows a potential implementation diagram of step S110 in the method for data processing according to one embodiment of the present disclosure.

In one possible implementation, as shown in FIG. 2, at S110, updating the intermediate storage information according to the data to be processed and the address information of the data to be processed in a first storage space may comprise:

At S1101, determining a block corresponding to the address information of the data to be processed and a Hash value of the block.

In one possible implementation, the block at the address information of the data to be processed can be determined from the address information of the data to be processed and the size of each block in the first storage space (for example, the address information can be divided by the size of block), and the Hash value of the block corresponding to the address information of the data to be processed can be acquired with the same manner as that used for acquiring the Hash value of each block in the first storage space.

At S1102, querying in the intermediate storage information whether there is a first header unit corresponding to the Hash value of the block.

At S1103, if said first header unit does not exist, acquiring an idle unit in a second storage space as said first header unit.

At S1104, writing block information of the block into the first header unit.

In one possible implementation, the second storage space may be an SRAM or the likes. Before acquiring the data to be processed, the method may further comprise:

dividing the second storage space into multiple units, and setting the multiple units to a status of idle.

The size of each unit can be determined by one skilled in the art in practice, which is not limited by the present disclosure.

In one possible implementation, the second storage space can be entirely divided into multiple units of the same attribute and size; also, a part of the second storage space can be divided into multiple units of the same attribute and size (with each unit having a respective number); wherein, the specific size of the divided unit is not limited by the present disclosure, and the size of divided space in the second storage space is not limited by the present disclosure.

The multiple divided units can be set to a status of idle. An idle unit linked list can be constituted by the multiple units and units of a status of idle can be invoked to serve as a header unit or a section unit when needed.

By such a method, the divided units are the same and may serve as either the header unit or the section unit, characterized as being self-adaptive, improving the utilization efficiency of the second storage space. Also, as the second storage space (such as an SRAM) is quite small, by the method of the present disclosure, a mapping from a small second storage space to a large first storage space can be realized, improving the usage of resources.

In one possible implementation, a header unit can store therein block information (such as the number of the block and the address of the block) corresponding to the data to be processed, and can also store linking information with other header units.

In one possible implementation, a section unit can store therein information like the data content of the data to be processed.

In the intermediate storage information of the present disclosure, the Hash value of each block in the first storage space has a correspondence with the data to be processed undated into the intermediate storage information. The data to be processed undated into the intermediate storage information can be stored in the section unit and linked (correspondence) to the Hash values via the header unit. Once the Hash value of the block corresponding to the address information of the data to be processed, it can be queried in the intermediate storage information whether there is a first header unit corresponding to the Hash value of the block; if not, a corresponding first header unit is established. It should be understood that, when a corresponding first header unit is established, one idle unit can be selected as the section unit, data information of the data to be processed can be written into the section unit, and the section unit can be linked to the established first header unit (i.e., the section unit is inserted at the end of the linked list where the first header unit is located). By this, the updating of the data to be processed into the intermediate storage information can be implemented.

By combining the Hash value with the header unit, the present disclosure is applicable for first storage spaces of various sizes and for various management manners, being advantageous in high flexibility and efficiency.

Figure 3:
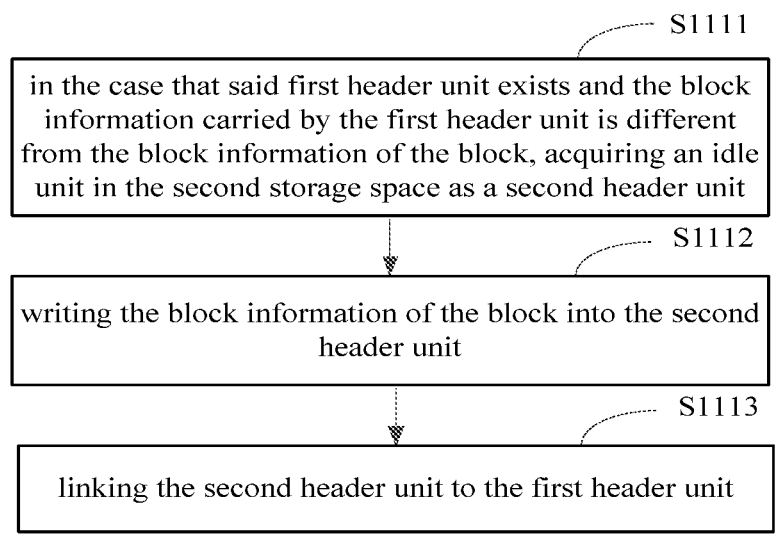
FIG. 3 shows another potential implementation diagram of step S110 in the method for data processing according to one embodiment of the present disclosure.

Referring to FIG. 3 as well, FIG. 3 shows a potential implementation diagram of step S110 in the method for data processing according to one embodiment of the present disclosure.

In one possible implementation, as shown in FIG. 3, at S110, updating intermediate storage information according to data to be processed and address information of the data to be processed in a first storage space may further comprise:

At S1111, in the case that said first header unit exists and the block information carried by the first header unit is different from the block information of the block, acquiring an idle unit in the second storage space as a second header unit.

At S1112, writing the block information of the block into the second header unit.

At S1113, linking the second header unit to the first header unit.

It should be understood that, when processing the block numbers for the first storage space, different blocks may have the same Hash value. When then different blocks have the same Hash value, in the intermediate storage information, the header units corresponding to multiple data to be processed may have a correspondence with the same Has value.

Therefore, when it is queried that a first header unit corresponding to the Hash value of the block exists in the intermediate storage information, it can also be determined whether the block information carried in the first header unit is the same as the block information of the block corresponding to the data to be processed. If they are different, an idle unit in the second storage space can be acquired as a second header unit. After the second header unit has been acquired, the block information of the block corresponding to the data to be processed into the second header unit, and the second header unit can be linked to the first header unit.

By this, the updating of the data to be processed into the intermediate storage information can be implemented.

Figure 4:
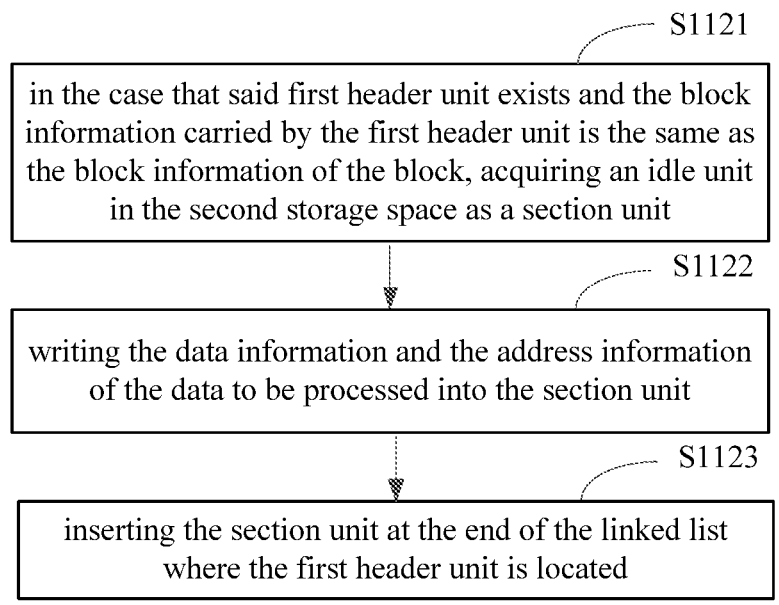
FIG. 4 shows yet another potential implementation diagram of step S110 in the method for data processing according to one embodiment of the present disclosure.

Referring to FIG. 4 as well, FIG. 4 shows another potential implementation diagram of step S110 in the method for data processing according to one embodiment of the present disclosure.

In one possible implementation, as shown in FIG. 4, at S110, updating intermediate storage information according to data to be processed and address information of the data to be processed in a first storage space may further comprise:

As S1121, in the case that said first header unit exists and the block information carried by the first header unit is the same as the block information of the block, acquiring an idle unit in the second storage space as a section unit;

At S1122, writing the data information and the address information of the data to be processed into the section unit; and At S1123, inserting the section unit at the end of the linked list where the first header unit is located.

When it is determined that the first header unit exists in the intermediate storage information and the block information carried by the first header unit is the same as the block information of the block corresponding to the data to be processed, an idle unit may be acquired from the second storage space as a section unit; after the data information of the data to be processed is written into the section unit, the section unit can be inserted at the end of the linked list where the first header unit is located.

In one possible implementation, when it is queried that the first header unit exists, section units can be inserted into the linked list where the first header unit is located sequentially.

The above descriptions will be detailed with the following examples. It should be noted that, the examples described in parts of the present disclosure should not be construed as limiting the disclosure.

Figure 5:
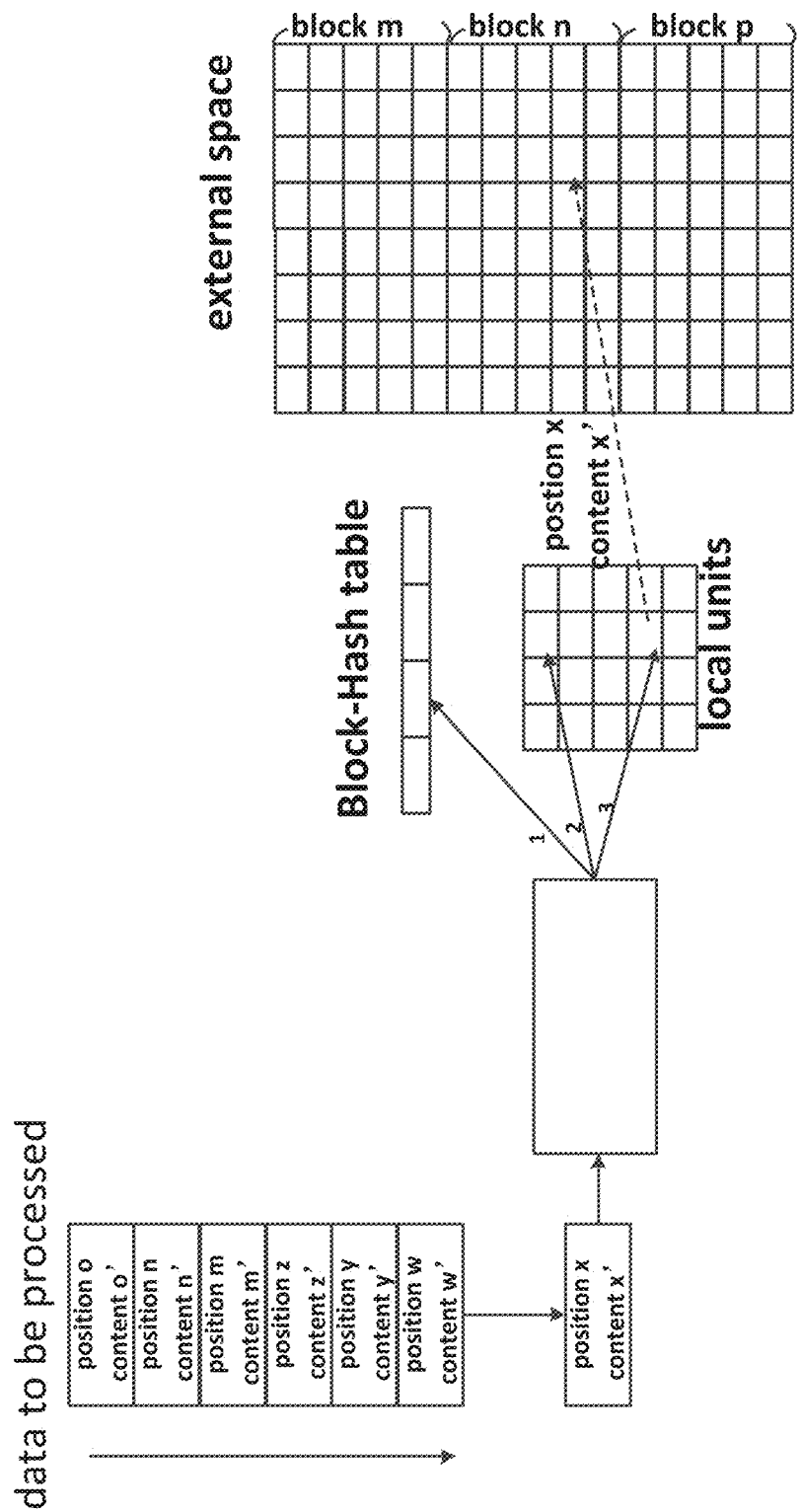
FIGS. 5 and 6 are diagrams showing the direction of data flow in the method for data processing according to one embodiment of the present disclosure.
Figure 6:
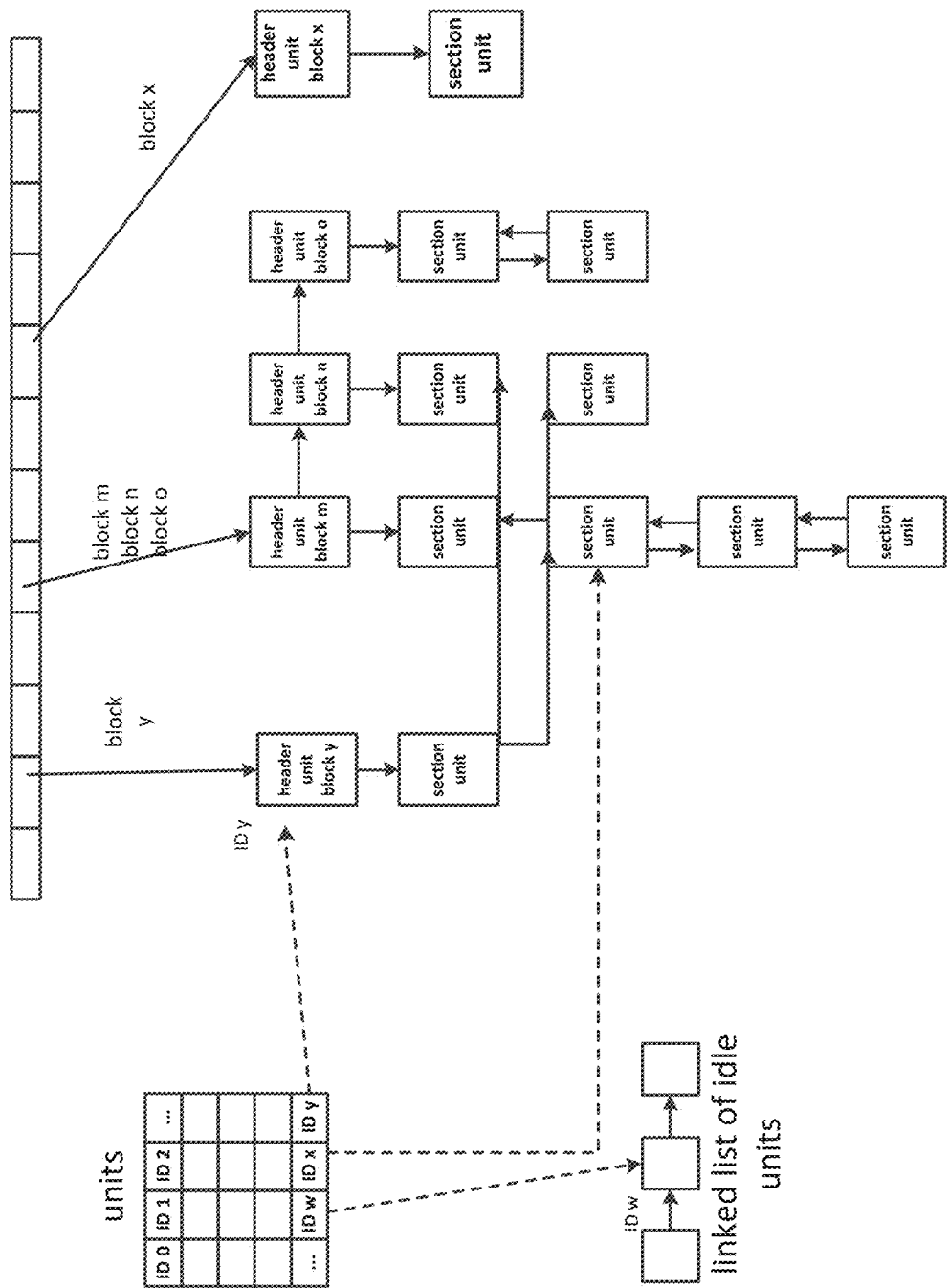

Referring to FIGS. 5 and 6, FIGS. 5 and 6 are diagrams showing the direction of data flow in the method for data processing according to one embodiment of the present disclosure.

As shown in FIG. 5, data to be processed (content) and its address information (position) are acquired; and the number of data to be processed can be plurality.

In one possible implementation, one of the data to be processed can be selected firstly for update. For example, data can be acquired with an order of the arriving times of the data to be processed, or can be acquired randomly. Obviously, in other embodiments, several data can be selected at the same time for simultaneous update, which is not limited by the present application.

After each block in the first storage space (external space) has been converted into a Hash value, with respect to the block-Hash table in FIG. 5, Hash values of the blocks and correspondences between the blocks and the Hash values can be stored in the block-Hash table respectively.

In an example, when the data to be processed for update has been selected, according to steps S1101-S1104, the block corresponding to the address information of the data to be processed and a Hash value of the block can be determined, and it can be queried in the intermediate storage information (the block-Hash table) whether there is a first header unit corresponding to the Hash value of the block. If the first header unit does not exist in the block-Hash table, one of the idle units from the second storage space is selected as the first header unit; and the block information is written into the first header unit.

For example, referring to FIG. 6, if the block corresponding to the address information of the data to be processed is block y, when it is queried that the Hash value block y has no corresponding first header unit, one idle unit is acquired as the first header unit from the linked list of idle units. The block information of blocky is written into the first header unit, a correspondence between the first header unit and the corresponding Hash value in the block-Hash table is established, the data information of the data to be processed is written into the section unit, and the section unit is linked to the first header unit.

In an example, when the data to be processed that is about to be updated is selected, the block corresponding to the address information of the data to be processed and the Hash value of the block may be determined, and query in the intermediate storage information (block-Hash table) whether there is a first header unit corresponding to the hash value of the block. According to steps S1111-S1113, when it is determined that the first header unit exists and the block information carried in the first header unit is different from the block information of the block, an idle unit in the linked list of idle units may be acquired as the second header unit, the block information of the block is written into the second header unit, and the second head unit is linked to the first head unit.

As shown in FIG. 6, in the block-Hash table, a Hash value has a correspondence with the header unit carrying the block information of block m. If the Hash value of the block corresponding to the address information of the data to be processed is the same as Hash value corresponding to block m, then it can be determined from the above method that the first header unit (header unit for block m) corresponding to the Hash value of the block exists in the block-Hash table, and it is further determined that the block information carried in the first header unit (block m) is not the same as the block information corresponding to the data to be processed (block n). In such case, an idle unit can be acquired from the idle unit linked list as the second header unit, the block information of block n can be written into the second header unit, and the second header unit can be linked to the first header unit (i.e., a correspondence between the second header unit and the first header unit can be established).

Certainly other information can be written into the header units; for example, linking relationships between header units can be written into the header units.

In an example, when the data to be processed for update has been selected, the block corresponding to the address information of the data to be processed and a Hash value of the block can be determined, and it can be queried in the intermediate storage information (the block-Hash table) whether there is a first header unit corresponding to the Hash value of the block. According to steps S1121-S1123, if the first header unit exists and the block information carried by the first header unit is the same as the block information of the block corresponding to the data to be processed (e.g., a header unit comprising the block information of block m), an idle unit in the idle unit linked list can be acquired as a section unit, the data information and the address information of the data to be processed can be written into the section unit, and the section unit can be inserted at the end of the linked list where the first header unit is located (e.g., the last section unit in the linked list where a header unit comprising the block information of block m).

Updating the data to be processed into the intermediate storage information has been described as above; and the performance of the operation corresponding to the data to be processed using the intermediate storage information in the first storage space after the intermediate storage information meet the preset size will be given below.

In one possible implementation, the preset size can be a size of a certain number of the section units and header units in the intermediate storage information. Obviously, a preset module can be configured as needed. Any number can be set to be the preset size as needed by one skilled in the art, which is not limited by the present disclosure.

In one possible implementation, at step S120, performing the operation corresponding to the data to be processed using the intermediate storage information in the first storage space may comprise:

with regard to a header unit in the intermediate storage information, with an order of the section units in the linked list where the first header unit is located, acquiring the data information and the address information in each of the section units;

determining an address to be processed for the first storage space from the address information;

performing the operation at the address to be processed using the data information.

Once the intermediate storage information meets the preset size, any one header unit in the intermediate storage information can be selected for performing the operation. Obviously it can be selected as needed that which one header unit should be subject to the operation first. For example, the header units can be selected by their insertion order.

After the header unit for operation has been selected, with respect to the selected header unit, operations can be performed on the selected section units sequentially, with an order of the insertion of each section unit into the linked list where the header unit is located.

In different applicable scenarios, the operations performed using the data information at the address to be processed in the first storage space may be different, and the data contents included in the data information may be different as well.

For example, when the first storage space is a storage space of SSD, the above method can be applied to a flash controller to manage the Logical-to-Physical (L2P) mapping table. In this case, the data information may include the data content and the data length of the data to be processed, wherein performing the operation at the address to be processed using the data information comprises:

writing the data content into the first storage space in accordance with the data length and the address to be processed.

Figure 7:
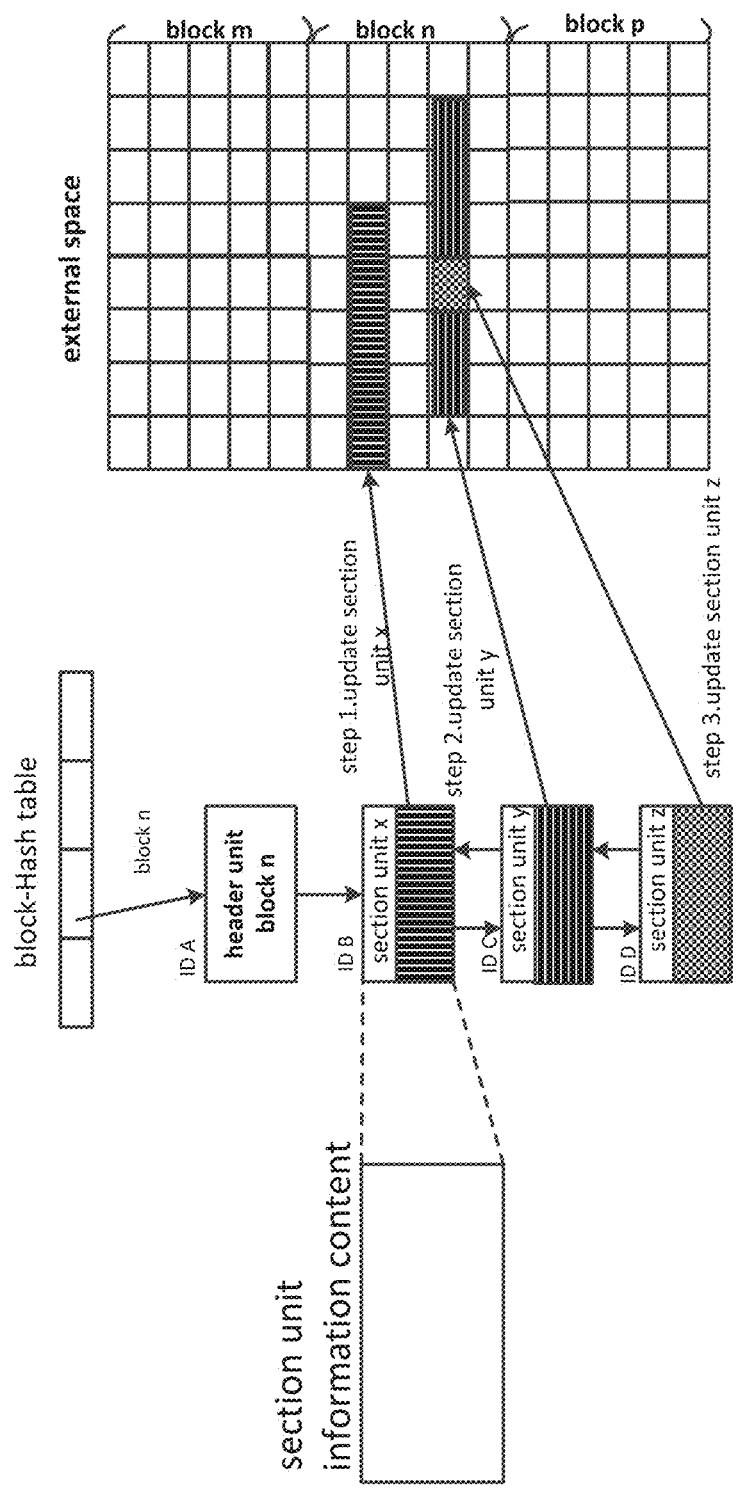
FIG. 7 is another diagram showing the direction of data flow in the method for data processing according to one embodiment of the present disclosure.

For example, referring to FIG. 7, FIG. 7 is another diagram showing the direction of data flow in the method for data processing according to one embodiment of the present disclosure.

As shown in FIG. 7, in an example, the header unit including the block information of block n is selected for operation; at this time, section units can be selected for operation in the order of insertions of the section units into the linked list. For example, the section unit x is inserted into the linked list firstly, the section unit y is inserted into the linked list secondly, and the section unit z is inserted into the linked list thirdly. Therefore, the section unit x can be selected first, and the data information for section unit x is updated into the first storage space. Then the section unit y is selected, and finally the section unit z is selected. Certainly, when the section units are selected for update, the address for operation may be determined according to the address information in the section unit, and the content for operation can be determined according to the data information. For example, offset information in the block n may be obtained from the address information in the section unit, so as to determine the address to be processed or the like.

By the above method, it can be realized by the present disclosure that the data to be processed in the intermediate storage information can be updated into the first storage space. By such method, the efficiency of data updating can be improved, and the number of data update can be reduced effectively. For an SSD, reducing the number of updates contributes a lot to an increased life time of the SSD. Also, by writing the data length of the data to be processed for update into the section unit, a scope for updated in the first storage space can be distinguished effectively, improving the efficiency of the data update.

The above method is also applicable in a scenario of calculations and records about the active pages of an NAND Super Block (SPB). If the first storage space is a storage space of a flash memory, by applying the method to the flash controller, the active pages in the flash memory can be managed.

In such case, the data information includes valid-or-invalid enabling information, initiative flash page and an update length, wherein performing the operation at the address to be processed using the data information comprises:

Setting a corresponding position in the first storage space valid or invalid according to the valid-or-invalid enabling information, the initiative flash page, the update length and the address to be processed.

By the above method, the present disclosure can strengthen the management on the active page of the flash memory, increasing the speed of update, and reduce the number of updates.

Certainly, the method according to the present disclosure is also applicable in other scenarios. The above are examples of a scenarios in which the present disclosure can be applied, but not exhaustive and do not limit the present disclosure.

In one possible implementation, after step S120 where the operation corresponding to the data to be processed is performed in the first storage space using the intermediate storage information, the method further comprises:

Releasing the header unit and the section unit in the intermediate storage information as idle units.

After the operation has been performed, in the first storage space, on the data to be processed in the intermediate storage information, the header and the section units of the intermediate storage information can be released as idle units for future use.

Figure 8:
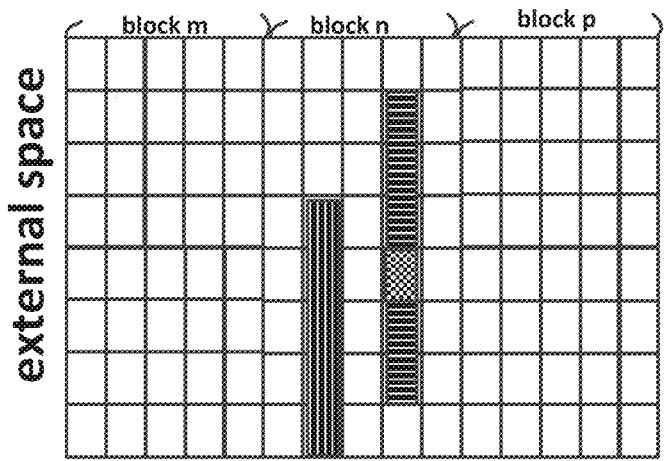
FIG. 8 is a diagram showing the release of units in the method for data processing according to one embodiment of the present disclosure.
Figure 8:
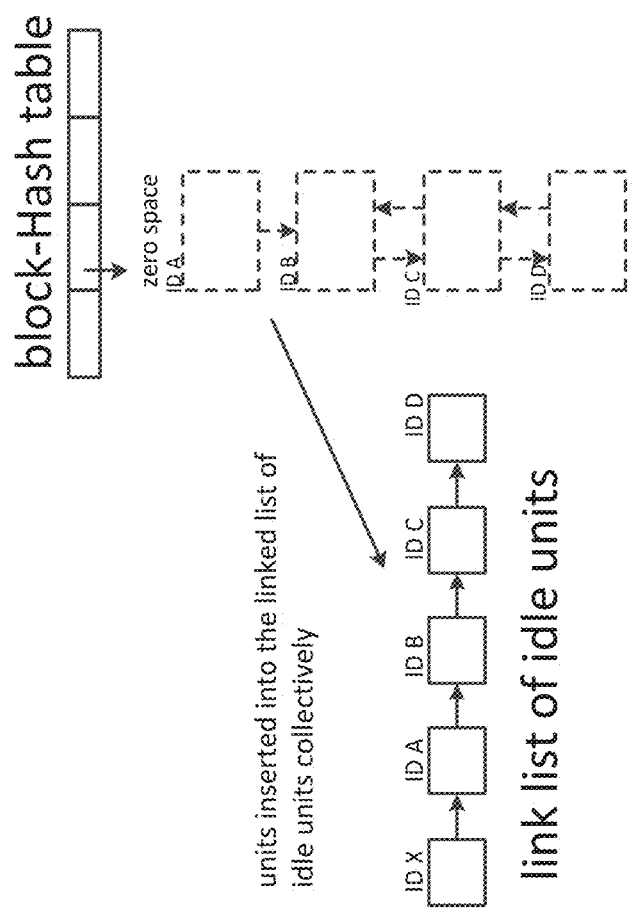

Referring to FIG. 8, FIG. 8 is a diagram showing the release of units in the method for data processing according to one embodiment of the present disclosure.

As shown in FIG. 8, after the operations on data are finished, the header and sections units can be inserted collectively into a restricting linked list, for the release of the header and section units.

By such a manner, resources can be recycled for future use.

In one possible implementation, the method further comprises:

Acquiring a request for data query, and querying data in the intermediate storage information according to the request for data query.

The request for data query can be received and data can be queried in the intermediate storage information according to the request for data query before performing the operation corresponding to the data to be processed in the first storage space using the intermediate storage information.

For example, the request for data query may include the address information of the data to be queried. The block and the Hash value of the block can be obtained through the address information. A corresponding header unit can be queried rapidly in the intermediate storage information (block-Hash table) through the Hash value. And after the corresponding header unit has been queried, needed data (in the section units) can be queried rapidly in the linked list where the header unit is located.

By the above method, the efficiency in data query can be improved.

In one possible implementation, the method further comprises:

acquiring a request for data deletion and deleting data in the intermediate storage information according to the request for data deletion.

The request for data deletion can be received and data to be deleted can be queried and deleted in the intermediate storage information according to the request for data deletion before performing the operation corresponding to the data to be processed in the first storage space using the intermediate storage information.

For example, the request for data deletion may include the address information of the data to be deleted. The block and the Hash value of the block can be obtained through the address information. A corresponding header unit can be queried rapidly in the intermediate storage information (block-Hash table) through the Hash value. And after the corresponding header unit has been queried, needed data (in the section units) can be queried rapidly in the linked list where the header unit is located. After the corresponding section units have been obtained, the data deletion can be achieved by releasing the section units.

By the above method, the efficiency in data deletion can be improved.

When the data to be processed is increment data, each section unit in the linked list are linked in a continuous manner. By such a feature of the data to be processed, when the request for data query and the request for data deletion are received, rapid response can be made, improving the efficiency in the data query and data deletion significantly.

Figure 9:
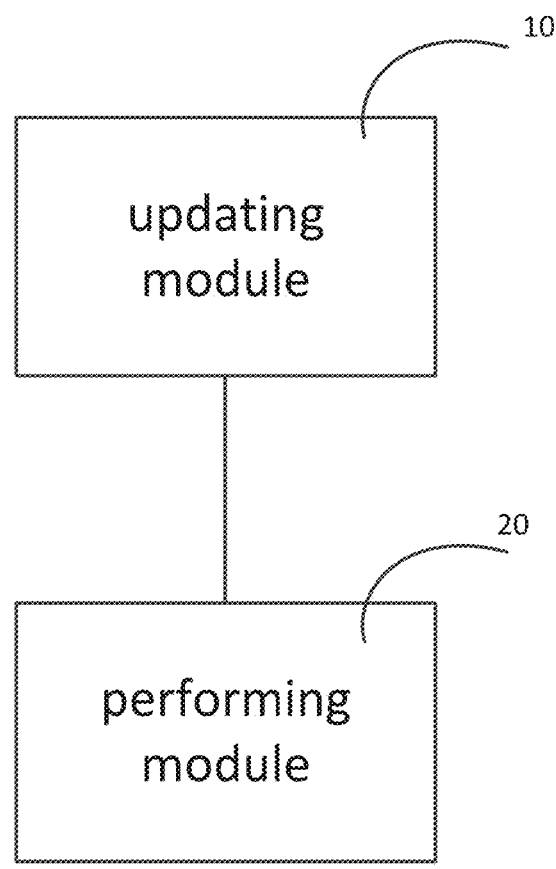
FIG. 9 shows a block diagram of the device for data processing according to one embodiment of the present disclosure.

Referring to FIG. 9, FIG. 9 shows a block diagram of the device for data processing according to one embodiment of the present disclosure. The device can be applied in a terminal or a server.

In one possible implementation, as shown in FIG. 9, the device comprises:

The updating module 10, configured to update the intermediate storage information according to the data to be processed and the address information of the data to be processed in the first storage space, until the intermediate storage information has reached a preset size, wherein the intermediate storage information includes storage space information of the first storage space and the data to be processed that has been updated into the intermediate storage information, and the data to be processed that has been updated into the intermediate storage information has a correspondence with the storage space information with the correspondence being established based on the address information.

The performing module 20 connected to the updating module 10, the performing module 20 is configured to perform, in the first storage space, an operation corresponding to the data to be processed using the intermediate storage information, when the intermediate storage information reaches the preset size.

By the above device, after acquiring the data to be processed, the present disclosure teaches to update the intermediate storage information according to the data to be processed and the address information of the data to be processed in the first storage space, until the intermediate storage information has reached a preset size; and performing in the first storage space an operation corresponding to the data to be processed using the intermediate storage information when the intermediate storage information reaches the preset size. According to the present disclosure, by updating the intermediate storage information with data to be processed and performing in the first storage space an operation corresponding to the data to be processed using the intermediate storage information when the intermediate storage information reaches a certain size, the computing cost for performing an operation corresponding to the data to be processed in the first storage space can be reduced, the efficiency in performing the corresponding operation can be improved, and with intermediate storage information adapted to the first storage spaces of different sizes, the number of operations on the first storage spaces can be reduced.

It should be understood that, the device for data processing is a device corresponding to the method for data processing. For details about the device for data processing please refer to the above descriptions on the method for data processing, which will not be repeated here.

In one possible implementation, the storage space information includes correspondences between blocks divided from the first storage space and Hash values; the intermediate storage information further includes header units and section units, with the header unit carrying block information and the section units carrying data to be processed that has been updated.

Figure 10:
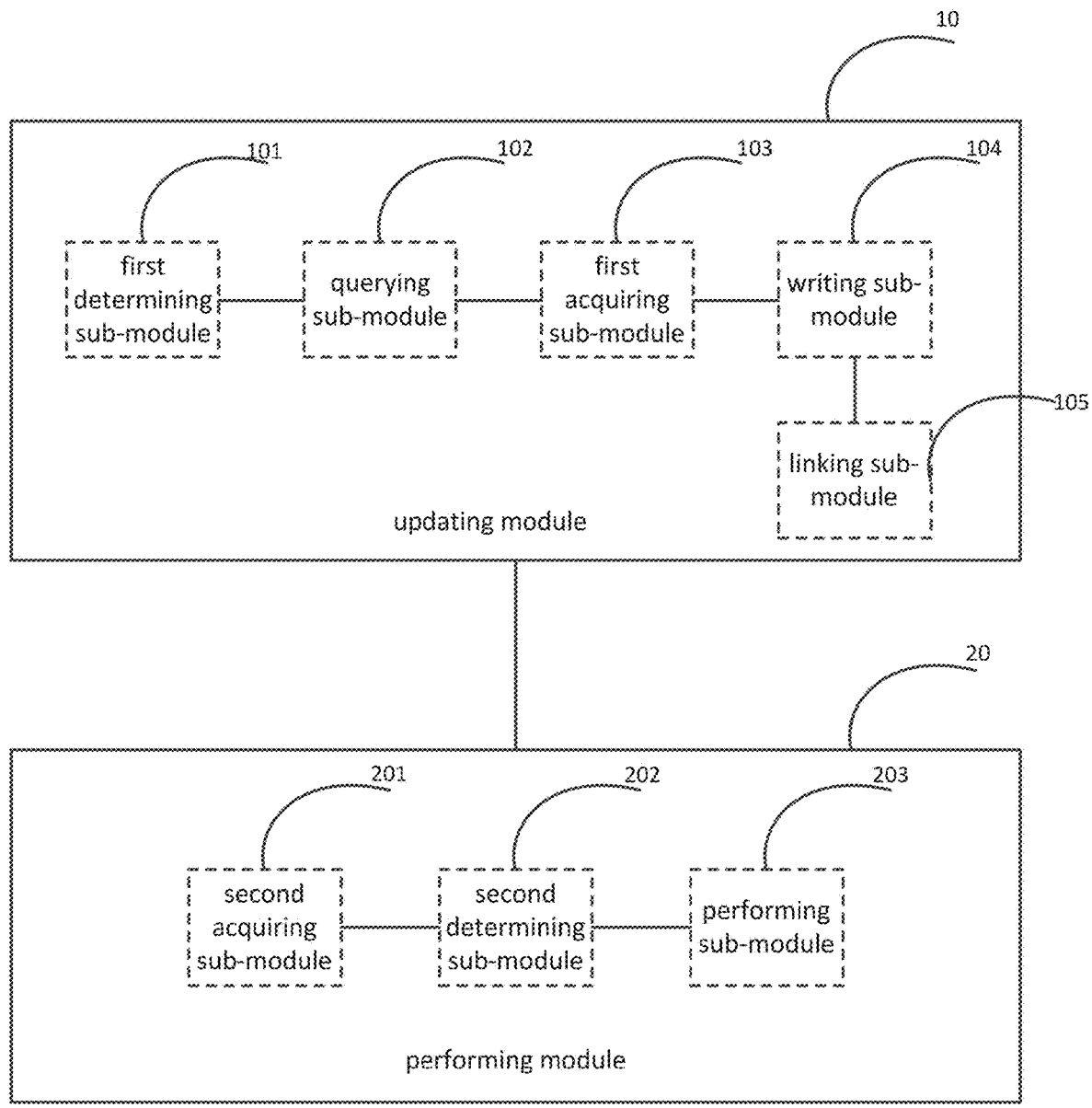
FIG. 10 shows a block diagram of the device for data processing according to one embodiment of the present disclosure.

Referring to FIG. 10, FIG. 10 shows a block diagram of the device for data processing according to one embodiment of the present disclosure.

In one possible implementation, the updating module 10 comprises:

The first determining sub-module 101, configured to determine a block corresponding to the address information of the data to be processed and a Hash value of the block.

The querying sub-module 102 connected to the first determining sub-module 101, the querying sub-module 102 is configured to query in the intermediate storage information whether there is a first header unit corresponding to the Hash value of the block.

The first acquiring sub-module 103 connected to the querying sub-module 102, the first acquiring sub-module 103 is configured to acquire an idle unit in a second storage space as said first header unit if the first header unit does not exist.

The writing sub-module 104 connected to the first acquiring sub-module 103, the writing sub-module 104 is configured to write block information of the block into the first header unit.

By combining the Hash value with the header unit, the present disclosure is applicable for first storage spaces of various sizes and for various management manners, being advantageous in high flexibility and efficiency.

In one possible implementation, the first acquiring sub-module is further configured to acquire an idle unit in the second storage space as a second header unit, in the case that the first header unit exists and the block information carried by the first header unit is different from the block information of the block.

The writing sub-module is further configured to write the block information of the block into the second header unit.

Wherein, the updating module 10 further comprises:

The linking sub-module 105 connected to the writing sub-module 104, the linking sub-module 105 is configured to link the second header unit to the first header unit.

In one possible implementation, the first acquiring sub-module 101 is further configured to acquire an idle unit in the second storage space as a section unit, in the case that said first header unit exists and the block information carried by the first header unit is the same as the block information of the block.

The writing sub-module 104 is further configured to write the data information and the address information of the data to be processed into the section unit.

The linking sub-module 105 is further configured to insert the section unit at the end of the linked list where the first header unit is located.

In one possible implementation, the performing module 20 comprises:

The second acquiring sub-module 201, configured to acquire, with regard to a header unit in the intermediate storage information and with an order of the section units in the linked list where the first header unit is located, the data information and the address information in each of the section units.

The second determining sub-module 202 connected to the second acquiring sub-module 201, the second determining sub-module 202 is configured to determine an address to be processed for the first storage space from the address information.

The performing sub-module 203 connected to the second determining sub-module 202, the performing sub-module 203 is configured to perform the operation at the address to be processed using the data information.

In one possible implementation, the data information includes data content and a data length of the data to be processed, wherein the performing sub-module is further configured to write the data content into the first storage space in accordance with the data length and the address to be processed.

In one possible implementation, the data information includes valid-or-invalid enabling information, initiative flash page and an update length, wherein the performing sub-module is further configured to set a corresponding position in the first storage space valid or invalid according to the valid-or-invalid enabling information, the initiative flash page, the update length and the address to be processed.

In one possible implementation the device further comprises:

The releasing module connected to the performing module, the releasing module is configured to release header units and section units in the intermediate storage information as idle units, after performing, by the performing module, in the first storage space the operation corresponding to the data to be processed using the intermediate storage information.

With the releasing module, the present disclosure can achieve the recycle of resources for future use.

In one possible implementation, the device further comprises:

The querying module connected to the updating module, the querying module is configured to acquire a request for data query and query data in the intermediate storage information according to the request for data query.

With the querying module, the present disclosure can improve the efficiency in data query.

In one possible implementation, the device further comprises:

The deleting module connected to the updating module, the deleting module is configured to acquire a request for data deletion and delete data in the intermediate storage information according to the request for data deletion.

With the deleting module, the present disclosure can improve the efficiency in data deletion.

In one possible implementation, the device further comprises:

The first dividing module configured to divide the first storage space into multiple blocks, and number the divided blocks;

The processing module connected to the first dividing module, the processing module is configured to process the number for each block to obtain, as the storage space information of the first storage space, the Hash value of each block as well as a correspondence for each block between said block and the Hash value.

In one possible implementation, the device further comprises:

The second dividing module configured to divide the second storage space into multiple units and set the multiple units to a status of idle.

It should be understood that, the device for data processing is a device corresponding to the method for data processing. For details about the device for data processing please refer to the above descriptions on the method for data processing, which will not be repeated here.

Figure 11:
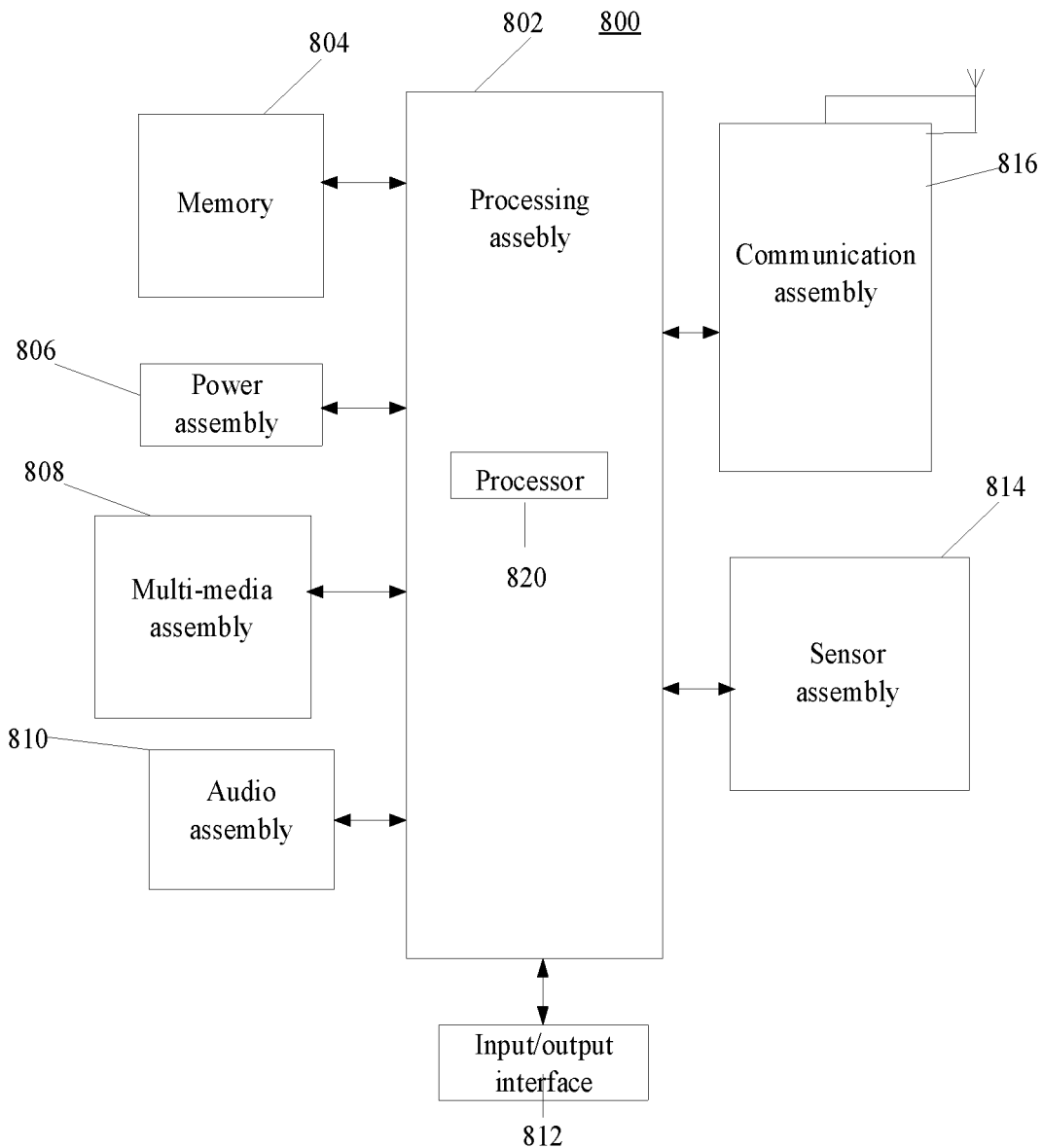
FIG. 11 shows a block diagram of the device for data processing according to one embodiment of the present disclosure.

Referring to FIG. 11, FIG. 11 shows a block diagram of the device for data processing according to one embodiment of the present disclosure. For example, device 800 may be a mobile phone, a computer, a digital broadcast terminal, a messaging device, a gaming console, a tablet device, a medical device, a fitness device, a personal digital assistant, or the like.

Referring to FIG. 11, the device 800 may include one or more of the following assemblies: a processing assembly 802, memory 804, a power assembly 806, a multimedia assembly 808, an audio assembly 810, an input/output (I/O) interface 812, a sensor assembly 814, and a communication assembly 816.

The processing assembly 802 usually controls the overall operation of device 800, such as operations associated with display, telephone calls, data communications, camera operations, and recording operations. The processing assembly 802 can include one or more processors 820 to execute instructions, so as to finish all or part of the steps of the above methods. Moreover, the processing assembly 802 can include one or more modules for interactions between the processing assembly 802 and other assemblies. For example, the processing assembly 802 can include a multimedia module for interactions between the multimedia assembly 808 and the processing assembly 802.

The memory 804 is configured to store various types of data to support the operations by the device 800. Examples of data include instructions for any application or method executed on the device 800, contact data, phone book data, messages, pictures, videos, or the like. The memory 804 can be implemented by any type of volatile or non-volatile storage device, or a combination thereof, such as static random access memory (SRAM), electrically erasable programmable read only memory (EEPROM), erasable programmable read only memory (EPROM), programmable read only memory (PROM), read only memory (ROM), magnetic memory, flash Memory, magnetic disk or optical Disk.

The power assembly 806 powers the various assemblies of the device 800. The power assembly 806 may include a power management system, one or more power supplies, and other assemblies associated with the generation, management and distribution of power for the device 800.

The multimedia assembly 808 includes a screen providing one output interface between the device and a user. In some embodiments, the screen can include a liquid crystal display (LCD) and a touch panel (TP). If the screen includes a touch panel, the screen can be implemented as a touch screen to receive input signal from the user. The touch panel includes one or more touch sensors to sense touches, slides, and gestures on the touch panel. The touch sensor may sense not only the boundary of the touch or sliding actions, but also the duration and pressure associated with the touch or slide operations. In some embodiments, the multimedia assembly 808 includes a front camera and/or a back camera. When the device 800 is in an operation mode, such as ah imaging mode or a video mode, the front camera and/or the back camera can receive external multimedia data. Each front and back camera can be a fixed optical lens system or have focal length and optical zoom capabilities.

The audio assembly 810 is configured to output and/or input audio signal. For example, the audio assembly 810 includes a microphone (MIC) that is configured to receive external audio signal when the device 800 is in an operational mode, such as a calling mode, a recording mode, and a voice recognition mode. The received audio signal may be further stored in the memory 804 or transmitted via the communication assembly 816. In some embodiments, the audio assembly 810 further includes a speaker for outputting audio signal.

The I/O interface 812 provides an interface between the processing assembly 802 and peripheral interface modules, which may be a keyboard, a click wheel, buttons or the like. The buttons may include, but are not limited to, a homepage button, a volume button, a start button, and a lock button.

The sensor assembly 814 includes one or more sensors for providing the device 800 with status assessments of various aspects. For example, the sensor assembly 814 can detect an open/closed status of the device 800, relative positions of the assemblies (such as the display and a keypad of the device 800). The sensor assembly 814 can also detect a change in position of the device 800 or an assembly thereof, the existence or absent of a contact between the user and the device 800, the orientation or acceleration/deceleration of the device 800, and a change in temperature of the device 800. The sensor assembly 814 can include a proximity sensor configured to detect the existence of nearby objects without any physical contact. The sensor assembly 814 may also include a light sensor, such as a CMOS or CCD image sensor, for use in imaging applications. In some embodiments, the sensor assembly 814 can also include an accelerometer, a gyro, a magnetic sensor, a pressure sensor, or a thermometer.

The communication assembly 816 is configured to facilitate wired or wireless communication between the device 800 and other devices. The device 800 can be connected into a wireless network based on a communication standard, such as WiFi, 2G or 3G, or a combination thereof. In an exemplary embodiment, the communication assembly 816 receives broadcast signal or broadcast-related information from an external broadcast management system via broadcast channels. In an exemplary embodiment, the communication assembly 816 further includes a near field communication (NFC) module for short range communication. For example, the NFC module can be implemented with radio frequency identification (RFID) technology, infrared data association (IrDA) technology, ultra-wideband (UWB) technology, Bluetooth (BT) technology, and other technologies.

In an exemplary embodiment, the device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, for performing the methods.

In an exemplary embodiment, there is also provided a non-volatile computer readable storage medium, such as a memory 804 comprising computer program instructions executable by the processor 820 of the device 800 to perform the methods.

Figure 12:
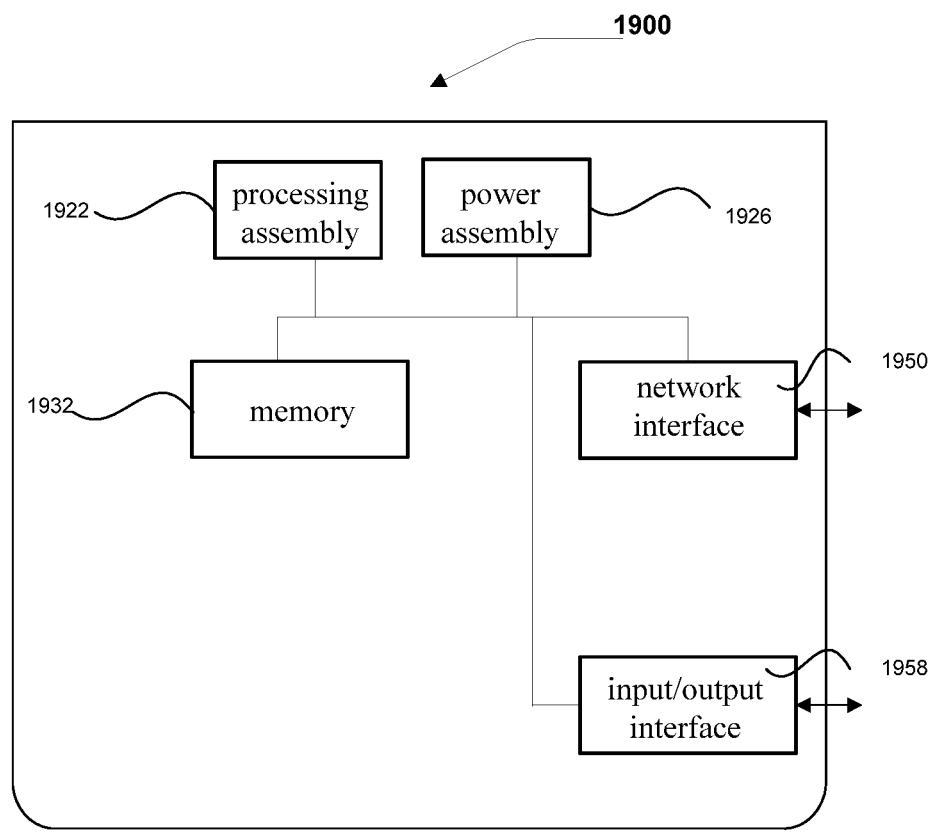
FIG. 12 shows a block diagram of the device for data processing according to one embodiment of the present disclosure.

Referring to FIG. 12, FIG. 12 shows a block diagram of the device for data processing according to one embodiment of the present disclosure. For example, the device 1900 may be provided as a server. Referring to FIG. 12, the device 1900 comprises a processing assembly 1922 that further includes one or more processors; and a memory resource represented by a memory 1932 for storing instructions, such as applications, executable by the processing assembly 1922. The applications stored in memory 1932 may include one or more modules, each corresponding to a set of instructions. In addition, the processing assembly 1922 is configured to execute instructions to perform the methods.

The device 1900 may further include: a power assembly 1926 configured to perform power management on the device 1900; a wired or wireless network interface 1950 configured to connect the device 1900 to a network; and an input/output (I/O) interface 1958. The device 1900 may be operated on the basis of an operating system stored in the memory 1932, such as Windows Server™, Mac OS X™, Unix™, Linux™, FreeBSD™, and the like.

In an exemplary embodiment, there is also provided a non-volatile computer readable storage medium, such as the memory 1932, that comprises instructions executed by the processing assembly 1922 of the device 1900 for performing the methods.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A method for data updating, comprising:
   updating intermediate storage information according to data to be updated in a first storage space and address information of the data to be updated, until the intermediate storage information has reached a preset size, wherein the intermediate storage information includes storage space information of the first storage space and the data to be updated in the first storage space, header units carrying block information, and section units carrying the data to be updated that has been updated into the intermediate storage information, and has a correspondence with the storage space information, wherein the correspondence is established based on the address information of the data to be updated, wherein the storage space information includes correspondences between blocks divided from the first storage space and Hash values of the blocks, wherein the updating of the intermediate storage information further comprises:
      determining a block corresponding to the address information of the data to be updated and a Hash value of the block;
      determining whether the header units includes a first header unit corresponding to the Hash value of the block based on the intermediate storage information;
      when the header units does not include the first header unit, acquiring an idle unit in a second storage space as the first header unit, and writing block information of the block into the first header unit; and
      when the header units includes the first header unit, and block information carried by the first header unit is the same as the block information of the block, acquiring an idle unit in the second storage space as a section unit, writing data information and the address information of the data to be updated into the section unit, and inserting the section unit at an end of a linked list where the first header unit is located; and
   in response to the intermediate storage information having reached the preset size, performing, in the first storage space, an operation corresponding to the data to be updated in the first storage space using the intermediate storage information.

2. The method according to claim 1, wherein the updating of the intermediate storage information according to the data to be updated and the address information of the data to be updated in the first storage space further comprises:
   when the first header unit exists and the block information carried by the first header unit is different from the block information of the block, acquiring an idle unit in the second storage space as a second header unit;
   writing the block information of the block into the second header unit; and
   linking the second header unit to the first header unit.

3. The method according to claim 2, wherein the performing, in the first storage space, of the operation corresponding to the data to be updated using the intermediate storage information comprises:
   with regard to a header unit in the intermediate storage information, with an order of the section units in the linked list where the first header unit is located, acquiring the data information and the address information of the data in each of the section units;
   determining an address to be updated for the first storage space from the address information; and
   performing the operation at the address to be updated using the data information.

4. The method according to claim 3, wherein the data information includes data content and a data length of the data to be updated, and wherein the performing of the operation at the address to be updated using the data information comprises:
   writing the data content into the first storage space in accordance with the data length and the address to be updated.

5. The method according to claim 3, wherein the data information includes valid-or-invalid enabling information, initiative flash page and an update length, and wherein the performing of the operation at the address to be updated using the data information comprises:
   setting a corresponding position in the first storage space valid or invalid according to the valid-or-invalid enabling information, the initiative flash page, the update length and the address to be updated.

6. The method according to claim 1, wherein after the performing in the first storage space of the operation corresponding to the data to be updated using the intermediate storage information, the method further comprises:
releasing the header units and the section units in the intermediate storage information as idle units.

7. The method according to claim 1, further comprising:
acquiring a request for data query, and querying data in the intermediate storage information according to the request for data query.

8. The method according to claim 1, further comprising:
acquiring a request for data deletion, and deleting data in the intermediate storage information according to the request for data deletion.

9. The method according to claim 1, further comprising:
dividing the first storage space into multiple blocks, and numbering the blocks;
processing a number for each block to obtain, as the storage space information of the first storage space, the Hash value of each block as well as a correspondence for each block between the block and the Hash value.

10. The method according to claim 1, further comprising:
dividing the second storage space into multiple units, and setting the multiple units to a status of idle.

11. A device for data processing, comprising:
a processor; and
a memory coupled to the processor and storing instructions, which, when executed by the processor, cause the device to perform operations comprising:
updating intermediate storage information according to data to be updated in a first storage space and address information of the data to be updated, until the intermediate storage information has reached a preset size, wherein the intermediate storage information includes storage space information of the first storage space and the data to be updated in the first storage space, header units carrying block information, and section units carrying the data to be updated that has been updated into the intermediate storage information, and has a correspondence with the storage space information, wherein the correspondence is established based on the address information of the data to be updated, wherein the storage space information includes correspondences between blocks divided from the first storage space and Hash values of the blocks, wherein the updating of the intermediate storage information further comprises:
determining a block corresponding to the address information of the data to be updated and a Hash value of the block;
determining whether the header units includes a first header unit corresponding to the Hash value of the block based on the intermediate storage information;
when the header units does not include the first header unit, acquiring an idle unit in a second storage space as the first header unit, and writing block information of the block into the first header unit; and
when the header units includes the first header unit, and block information carried by the first header unit is the same as the block information of the block, acquiring an idle unit in the second storage space as a section unit, writing data information and the address information of the data to be updated into the section unit inserting the section unit at an end of a linked list where the first header unit is located; and
in response to the intermediate storage information having reached the preset size, performing, in the first storage space, an operation corresponding to the data to be updated in the first storage space using the intermediate storage information.

12. The device according to claim 11, wherein the updating of the intermediate storage information further comprises:
acquiring the idle unit in the second storage space as a second header unit, when the first header unit exists and the block information carried by the first header unit is different from the block information of the block;
writing the block information of the block into the second header unit; and
linking the second header unit to the first header unit.

13. The device according to claim 11, wherein the performing, in the first storage space, of the operating corresponding to the data to updated using the intermediate storage information further comprises:
with regard to a header unit in the intermediate storage information and with an order of the section units in the linked list where the first header unit is located, acquiring the data information and the address information in each of the section units;
determining an address to be updated for the first storage space from the address information; and
performing the operation at the address to be updated using the data information.

14. The device according to claim 13, wherein the data information includes data content and a data length of the data to be processed, and wherein the performing of the operation at the address to be updated further comprises:
writing the data content into the first storage space in accordance with the data length and the address to be updated.

15. The device according to claim 13, wherein the data information includes valid-or-invalid enabling information, initiative flash page and an update length, wherein the performing of the operation at the address to be updated
setting a corresponding position in the first storage space valid or invalid according to the valid-or-invalid enabling information, the initiative flash page, the update length and the address to be updated.

16. The device according to claim 11, the operations further comprising:
releasing the header units and the section units in the intermediate storage information as idle units, after the performing, in the first storage space, of the operation corresponding to the data to be updated using the intermediate storage information.

17. The device according to claim 11, the operations further comprising:
acquiring a request for data query and query data in the intermediate storage information according to the request for data query.

18. The device according to claim 11, the operations further comprising:
acquiring a request for data deletion and delete data in the intermediate storage information according to the request for data deletion.

19. The device according to claim 11, the operations further comprising:
dividing the first storage space into multiple blocks, and numbering the divided blocks;

processing a number for each block to obtain, as the storage space information of the first storage space, the Hash value of each block as well as a correspondence for each block between said block and the Hash value.

20. The device according to claim 11, the operations further comprising:
dividing the second storage space into multiple units and set the multiple units to a status of idle.

21. A non-volatile computer readable storage medium storing computer program instructions, which, when being executed by a processor of a data processing device, cause the data processing device to perform operations comprising:
updating intermediate storage information according to data to be updated in a first storage space and address information of the data to be updated, until the intermediate storage information has reached a preset size, wherein the intermediate storage information includes storage space information of the first storage space and the data to be updated in the first storage space, header units carrying block information, and section units carrying the data to be updated that has been updated into the intermediate storage information, and has a correspondence with the storage space information, wherein the correspondence is established based on the address information of the data to be updated, wherein the storage space information includes correspondences between blocks divided from the first storage space and Hash values of the blocks, wherein the updating of the intermediate storage information further comprises:
determining a block corresponding to the address information of the data to be updated and a Hash value of the block;
determining whether the header units includes a first header unit corresponding to the Hash value of the block based on the intermediate storage information;
when the header units does not include the first header unit, acquiring an idle unit in a second storage space as the first header unit, and writing block information of the block into the first header unit; and
when the header units includes the first header unit, and block information carried by the first header unit is the same as the block information of the block, acquiring an idle unit in the second storage space as a section unit, writing data information and the address information of the data to be updated into the section unit, and inserting the section unit at an end of a linked list where the first header unit is located; and
in response to the intermediate storage information having reached the preset size, performing, in the first storage space, an operation corresponding to the data to be updated in the first storage space using the intermediate storage information.

\* \* \* \* \*